United States Patent [19]

Fiorina

[11] Patent Number: 4,498,127
[45] Date of Patent: Feb. 5, 1985

[54] STATIC CONVERTER WITH ELECTRIC VALVES COMPRISING A TWELVE-PHASE CONNECTION WITH TWO GRAETZ BRIDGES FOR THE SUPPRESSION OF HARMONICS 5 AND 7 OF NETWORK CURRENT

[75] Inventor: Jean-Noël Fiorina, Grenoble, France

[73] Assignee: Merlin Gerin, France

[21] Appl. No.: 444,525

[22] Filed: Nov. 26, 1982

[30] Foreign Application Priority Data

Nov. 30, 1981 [FR] France .................... 81 22539

[51] Int. Cl.³ .......................................... H02M 7/155
[52] U.S. Cl. ........................................ 363/5; 363/64; 363/68; 363/70
[58] Field of Search ............... 363/3, 5, 6, 44, 45, 363/64, 67–70

[56] References Cited

U.S. PATENT DOCUMENTS 3,308,368 3/1967 Schmidt .................................. 363/5
3,424,970 1/1969 Ross .................................. 363/3
3,832,619 8/1974 Pollard .
3,976,931 8/1976 Sterling .................................. 363/45

FOREIGN PATENT DOCUMENTS 154034 12/1979 Japan .................................. 363/68

Primary Examiner—William H. Beha, Jr.
Attorney, Agent, or Firm—Parkhurst & Oliff

[57] ABSTRACT

There is disclosed an alternating current to direct current static converter which includes a three-phase transformer interconnected with two rectifier bridges to produce a twelve-phase connection for direct current output. The twelve-phase connection is provided by coupling input terminals of one of the bridges to corresponding primary input terminals of each of the three phases of the transformer, and coupling input terminals of the other of the bridges to corresponding phase terminals of the secondary of the three-phase transformer. The outputs of the rectifier bridges are then coupled to provide the DC output. The transformer is constructed such that there is a 150 degree phase shift between the primary and secondary voltages of each phase of the three-phase transformer and a 30 degree phase shift between the input voltages to the rectifier bridges.

8 Claims, 7 Drawing Figures

Dy 5

Yd 5

Yz 5

STATIC CONVERTER WITH ELECTRIC VALVES COMPRISING A TWELVE-PHASE CONNECTION WITH TWO GRAETZ BRIDGES FOR THE SUPPRESSION OF HARMONICS 5 AND 7 OF NETWORK CURRENT

BACKGROUND OF THE INVENTION

The present invention relates to alternating current (AC) to direct current (DC) static converters and, more particularly, to a polyphase converter using multiple rectifier bridges.

In the prior art there are known devices which convert three-phase alternating current by use of twelve-phase rectifier structures to produce a DC output current wherein there is a 30 degree phase shift between the supply voltages of two bridges coupled to produce a direct current output.

According to a known device of the mentioned type, the 30° phase shift between the supply voltages of the two bridges is obtained owing to a three phase transformer having two secondary windings with star-delta or delta-star winding connection. The delta or star primary winding is supplied by the three phase network R, S, T, and the first bridge is connected to one of the secondary windings whereas the second bridge is electrically connected to the other secondary winding. The over-all dimensions of such a transformer of the twelve-phase device are important because they have to be sized up for the total power delivered by the converter.

SUMMARY OF THE INVENTION

In accordance with the present invention, two rectifier bridges are employed to provide a twelve-phase connection to a three-phase transformer. One of the bridges is coupled such that it has inputs from the corresponding phases of the primary winding while the other of the bridges is coupled to have inputs from corresponding phases of the secondary winding of the three-phase transformer. The transformer is constructed in such a manner as to have a clock hour number representing the phase shift between the primary and secondary voltages of the same phase so as to produce a 30 degree phase shift between the supply voltages of the two bridges.

The value of the clock hour number is set at 5 involving a 150° phase shift between the primary and secondary voltages of each phase of the transformer or (auto-transformer).

According to a first embodiment of the invention, a three-phase transformer has a voltage ratio which is close to or equal to 1, and comprises, either, a delta-star or a star-delta winding connection having respective phasor symbols Dy5 and Yd5. The transformer is sized up for half of the power delivered by the two converter bridges.

According to a second embodiment of the invention, the 30° phase shift between the supply voltages of the two bridges is ensured by a three-phase auto-transformer with a star-zigzag winding connection and a clock hour number of 5. It is sized up for a third of the value of the output power of the converter. The parallel connection of the two rectifier bridges is accomplished through two absorption coils. It is therefore an object of the invention to reduce the overall dimensions of a three-phase transformer used in a twelve-phase converter system.

Other advantages and technical data will more clearly appear from the following description, wherein reference is made to the accompanying drawings, in which:

DETAILED DESCRIPTION OF PREFERRED EMBODIMENTS

Figure 1:
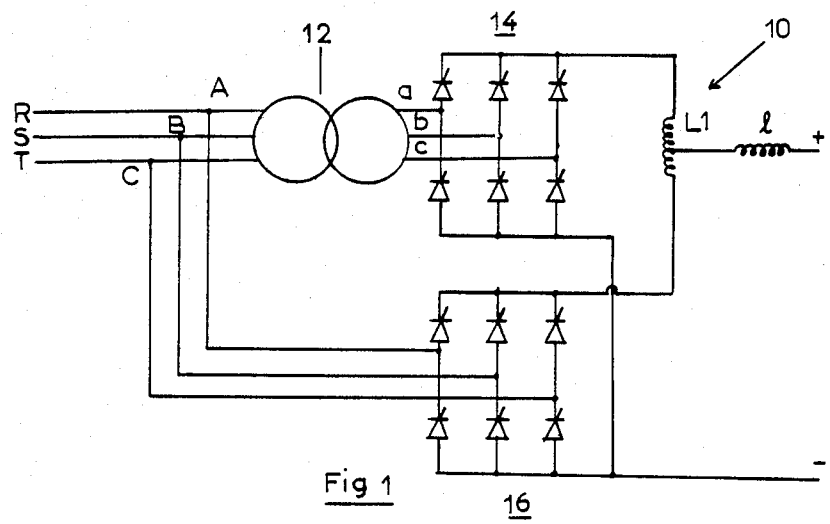
FIG. 1 shows a schematic view of a static converter according to the invention, with parallel twelve-phase connection of two Graetz bridges associated with a three-phase transformer.

On FIG. 1, an alternating/direct static converter 10 is connected to a three-phase R, S, T alternating network through a transformer 12. The converter 10 is constituted by a parallel connection of two three-phase rectifier bridges 14, 16 formed as electric valves, such as thyristors or diodes supplied by three-phase alternating voltages phase shifted by 30°. One of the Graetz bridges 14 is connected to the terminals a, b, c of the secondary winding of the three-phase transformer 12 having a voltage ratio substantially equal to 1. The primary winding of the transformer 12 is connected to the three-phase network R, S, T. The other Graetz bridge 16 is directly connected to the corresponding phases of the network and to the terminals A, B, C of the primary winding of the transformer 12. The star-delta or delta-star connection of the primary and secondary windings of the three-phase transformer 12 has a clock hour number of 5 to ensure the 30° phase shift of the supply voltages of the two bridges 14, 16. The two bridges 14, 16 are electrically connected in parallel by means of an absorption coil $L_1$ having a mid-point connected to the positive pole of the converter through a filtering coil 1. The assembly forms a parallel twelve-phase connection.

Figure 2:
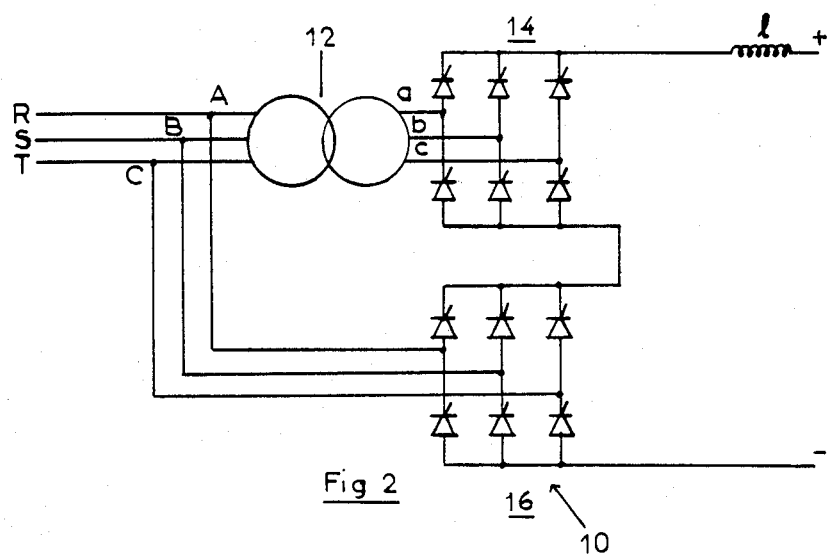
FIG. 2 represents a variant of FIG. 1, illustrating a series twelve-phase connection.

FIG. 2 shows a variant of FIG. 1, illustrating a series twelve-phase device obtained by a series connection of two three-phase Graetz bridges 14, 16 supplied by voltages which are phase shifted by 30°. The transformer 12 has a predetermined phasor diagram and its secondary winding is connected to the bridge 14, whereas the other bridge 16 is connected to the terminals A, B, C of the primary winding. The value of the rectified voltage is in this case twice that of the device shown in FIG. 1. There is no absorption coil in the direct circuit but solely a filtering coil 1.

Figure 3:
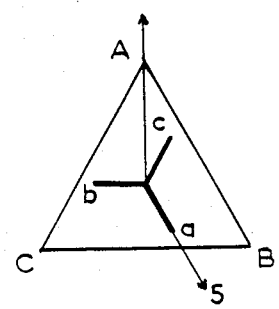
FIGS. 3 and 4 show the phasor diagrams of the primary and secondary voltages of two connection types of the transformer used in the devices shown in FIG. 1 or 2.
Figure 4:
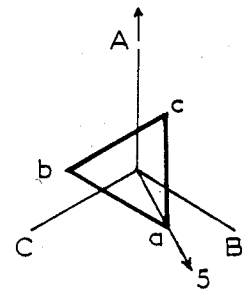

FIGS. 3 and 4 illustrate phasor diagrams of the primary and secondary windings of the three-phase transformer 12 with two winding connections, either delta-star (FIG. 3), or star-delta (FIG. 4). In the two cases the clock hour number of the phasor diagram of the transformer 12 is set at 5 and determines a 150° phase angle displacement between the voltages of the primary and secondary windings. The respective connections are represented by the phasor symbols Dy5 and Yd5.

The parallel and series twelve-phase devices shown in FIGS. 1 and 2, with two Graetz bridges 14, 16 permit the elimination of harmonics 5 and 7 of the network R, S, T current. The three-phase transformer 12 with Dy5 or Yd5 connection is sized up for half of the power P delivered by the two bridges 14, 16.

Figure 5:
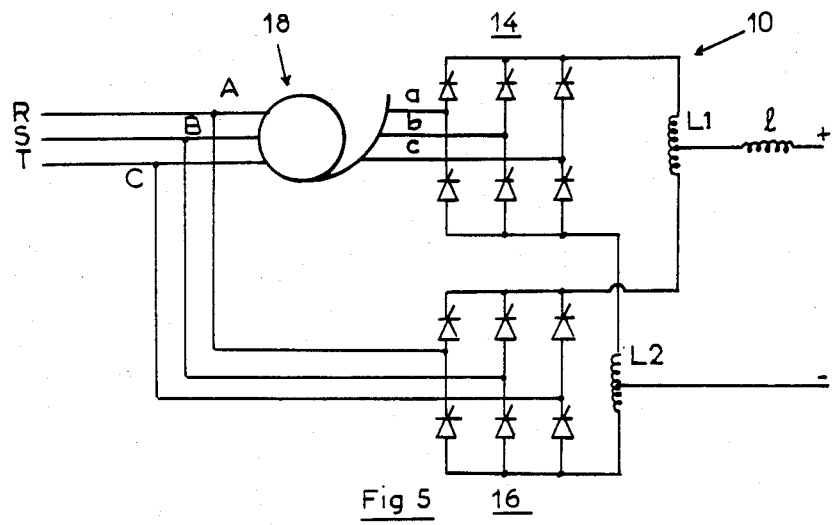
FIG. 5 is a variant of the device shown in FIG. 1 using an auto-transformer.

FIG. 5 represents another parallel twelve-phase connection having two three-phase Graetz bridges 14, 16, in which a three-phase auto-transformer 18 realizes the 30° phase shift between the supply alternating voltages of the two bridges 14, 16. The bridge 14 is connected to the terminals a, b, c of the secondary winding, and the other bridge 16 is connected to the terminals A, B, C of the primary winding.

Figure 6:
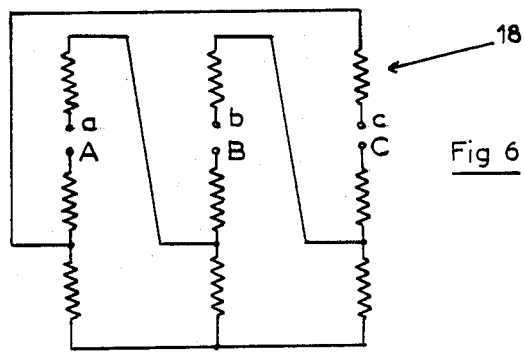
FIGS. 6 and 7 show respectively the winding connection and the phasor diagram of the auto-transformer shown in FIG. 5.
Figure 7:
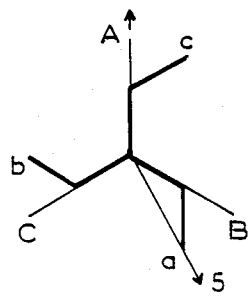

The electric winding connection of the auto-transformer 18 is illustrated in FIG. 6 and has a star-zigzag connection with a clock hour number of 5. FIG. 7 represents the phasor diagram of the voltages, and the phasor symbols Yz5 provide a 150° phase shift between the primary and secondary voltages of a same phase of the auto-transformer 18.

The parallel connection of the two rectifier bridges 14, 16 is accomplished on the direct circuit through two absorption coils $L_1$, $L_2$ essential to the good performance of the converter 12 owing to the absence of galvanic insulation between the two bridges 14, 16. One of the coils $L_1$ associated with the positive pole is connected to the cathodes of the three upper thyristors of each bridge 14, 16 by its opposite ends, whereas the other coil $L_2$ is connected to the anodes of the three lower thyristors of each bridge 14, 16.

The rectified voltage of the direct circuit is taken at mid-points of the absorption coils $L_1$, $L_2$ through a filtering auxiliary coil 1.

The device shown in FIG. 5 also enables the elimination of harmonics 5 and 7 of the network current and the three-phase auto-transformer 18 is sized up for a third of the power delivered by the two bridges 14, 16.

Obviously many modifications and variations are possible in light of the above teachings. It is therefore to be understood that within the scope of the appended claims, the invention may be practiced otherwise than is specifically described.

What is claimed is:

1. An alternating to direct current static converter including a polyphase rectifier system comprising:
a three-phase transformer having a primary winding with three-phase inputs and a secondary winding with three-phase outputs, said three-phase transformer being constructed and arranged to have predetermined winding connection and phase angle displacement such that a 150 degree phase angle displacement occurs between voltages in each phase of said primary inputs and the corresponding phase of the secondary winding outputs;
a first rectifier bridge having inputs coupled to associated ones of the phase inputs to said primary winding of said transformer and an output;
a second rectifier bridge having inputs coupled to associated ones of the phase outputs of said secondary winding and an output; and
means for coupling the outputs of said first and second rectifier bridges for providing a direct current output, said rectifier bridges being coupled to said three-phase transformer such that alternating voltages applied to the input terminals of said first rectifier bridge from the phase inputs to said primary winding are shifted 30 degrees from the voltages applied to the input terminals of the second rectifier bridge from the phase outputs of said secondary winding.

2. The converter of claim 1 wherein said three-phase transformer has a voltage ratio substantially equal to one and comprises a delta-star winding configuration having a phasor symbol Dy5 and wherein said transformer is constructed for half of the value of power delivered by the converter.

3. The converter of claim 1 wherein said three-phase transformer has a voltage ratio substantially equal to one and comprises a star-delta winding configuration having a phasor symbol Yd5 and wherein said transformer is constructed for half of the value of the power delivered by the converter.

4. The converter of claim 1 wherein said transformer is a three-phase auto transformer and includes a star-zigzag winding connection having a phasor symbol Yz5 and wherein said auto transformer is constructed for a third of the value of the power delivered by the converter.

5. The converter of claim 1 wherein said first and second rectifier bridges are Graetz bridges each formed by six controlled rectifiers.

6. The converter of claim 5 wherein said controlled rectifiers are thyristors.

7. The converter of claim 1 wherein said outputs of said first and second rectifier bridges are coupled in electrical parallel to produce a twelve-phase connection.

8. The converter of claim 1 wherein the outputs of said first and second rectifier bridges are connected in electrical series to produce a twelve-phase connection.

* * * * *